United States Patent [19]

Soschenko et al.

[11] 4,075,947
[45] Feb. 28, 1978

[54] AIR TIGHT CONNECTION BETWEEN PNEUMATICALLY CONVEYED CONTAINERS

[76] Inventors: Evgeny Maximovich Soschenko, Polotskaya ulitsa, 16/14, korpus 4, kv. 46; Ivan Timofeevich Zonenko, Saperny proezd, 8, korpus 3, kv. 72; Adolf Moritsovich Alexandrov, Federativny prospekt, 6, korpus 3, kv. 8; Vladimir Efimovich Aglitsky, Zatsepsky val, 6/13, kv. 61; Jury Abramovich Tsimbler, Sojuzny prospekt, 10, kv. 261; Ilya Solomonovich Kantor, Malo-Moskovskaya ulitsa, 31, kv. 45; Jury Arnoldovich Topolyansky, Matveevskaya ulitsa, 10, korpus 4, kv. 233; Anatoly Petrovich Chizhikov, ulitsa Petrovka, 26, kv. 3; Igor Igorievich Volyansky, ulitsa Stratonavtov, 12, korpus 1, kv. 12, all of Moscow, U.S.S.R.

[21] Appl. No.: 668,446

[22] Filed: Mar. 19, 1976

[30] Foreign Application Priority Data

Mar. 20, 1975 U.S.S.R. .................................. 2112002

[51] Int. Cl.² ............................................. B61B 13/10
[52] U.S. Cl. .......................... 104/23 FS; 104/138 R; 104/155; 243/39
[58] Field of Search ............... 104/138 R, 134, 23 FS, 104/155; 105/365; 243/38, 39

[56] References Cited

U.S. PATENT DOCUMENTS

| 1,183,198 | 5/1916 | Hills | 243/32 |
| 3,384,031 | 5/1968 | Dashew et al. | 104/138 R |
| 3,385,390 | 5/1968 | Guienne | 104/134 X |
| 3,919,944 | 11/1975 | Jorg | 104/23 FS X |
| 3,952,667 | 4/1976 | Kovanov et al. | 104/138 R |
| 4,023,500 | 5/1977 | Diggs | 104/23 FS |

FOREIGN PATENT DOCUMENTS 617,486 2/1949 United Kingdom ................ 104/138

*Primary Examiner*—Robert J. Spar
*Assistant Examiner*—Carl Rowold
*Attorney, Agent, or Firm*—Fleit & Jacobson

[57] ABSTRACT

The train of containers is intended for a plant for pneumatic transportation of goods through a tube, wherein the containers are interconnected by means of spherical joints.

On the end face of the leading or foremost container in the direction of the travel of the train there is mounted a front flap spanning the lower half of the gap between the container and the tube, whereas the end face of the trailing or tailmost container carries thereon a tail flap spanning the upper half of the same gap, the lateral sides of each container having mounted thereon side flaps acting as plain bearings and being adapted to travel along guideways mounted on the internal side wall of the tube. The opposing adjacent end faces of each pair of containers have mounted thereon bridging pieces engaging each other by their end faces having conjugating spherical surfaces having for their geometrical center the center of the spherical joint, the bridging pieces being adapted to close off the gaps between adjacent containers in the train.

2 Claims, 4 Drawing Figures

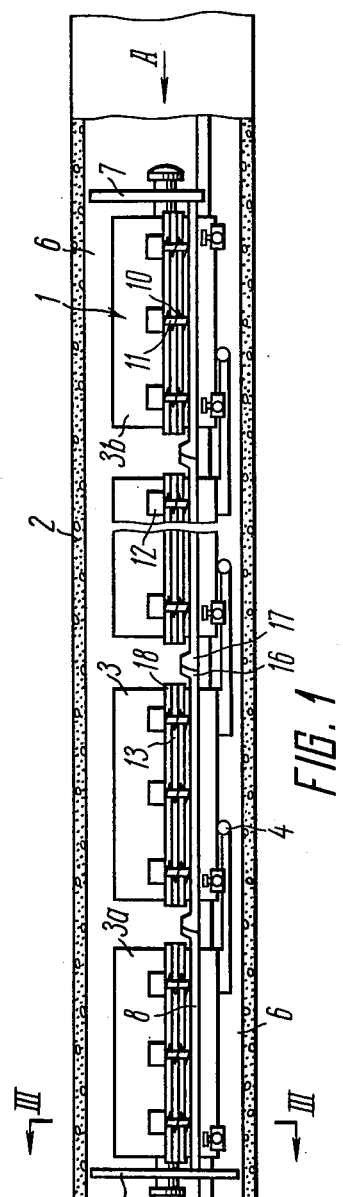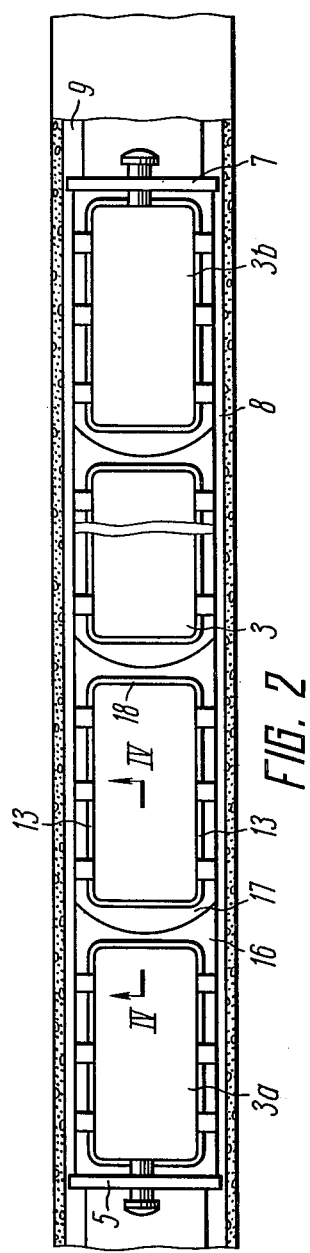

AIR TIGHT CONNECTION BETWEEN PNEUMATICALLY CONVEYED CONTAINERS

The present invention relates to plants for pneumatic transportation of goods through a pipeline of tube and, more particularly, it relates to trains of containers operable in such plants.

It is most expedient to employ trains of containers, constructed in accordance with the invention, in plants having tubes of a diameter as great as one meter and even greater.

There are known in the prior art trains of containers for plants for pneumatic transportation of goods in containers through a tube, comprising a plurality of pivotally interconnected containers. The end face of the foremost contaner in the direction of the travel of the train has mounted thereon a front flop spanning the lower half of the gap between the container and the tube. The end face of the tailmost container carries thereon a tail flop spanning the upper half of the gap between the container and the tube. Each container has side longitudinal flaps mounted on the lateral sides thereof, these longitudinal flops spanning the gap between the side walls of the container and the tube and also acting as the plain bearings of the travelling train.

These side flaps bear upon guideways secured to the internal side wall of the tube.

To close off the gaps between each adjacent pair of the containers, there are provided bridge pieces mounted on the opposing end faces of each adjacent pair of containers, these bridging pieces engaging each other and the longitudinal flaps of the respective containers.

Owing to the provision of the front, tail and longitudinal flaps, as well as of the bridging pieces between the containers the train of the containers hovers along the tube on an "air cushion".

In these trains of the prior art the bridging pieces of the adjacent containers are made to overlap, i.e., one of them overlaps the other.

With the train travelling along the tube, it is quite possible that at sloping portions or climbs of the path of the tube and at uneven portions thereof the containers might become displaced in a vertical plane relative to one another, whereby a slit forms between the overlapping bridging pieces. This slit involves excessive bleeding of the compressed air, and hence, additional waste of energy.

It is an object of the present invention to create a train of containers for a plant for pneumatic transportation of goods through a tube, wherein the bridging pieces should be of a structure enabling to minimize the bleeding of compressed air between the bridging pieces of the adjacent pairs of containers.

With this and other objects in view, there is hereby disclosed a train of containers for pneumatic transportation of goods through a tube, comprising a plurality of pivotally interconnected containers and having on the end face of the foremost container in the direction of the travel of the train a front flap spanning the lower half of the gap between the container and the tube and having on the end face of the tailmost container a tail flap spanning the upper half of this gap, and longitudinal flaps acting as plain bearings mounted on the lateral sides of each container and adapted to travel along guideways mounted on the internal side wall of the tube, the opposing end faces of the adjacent pairs of the containers having mounted thereon bridging pieces engaging each other and also engaging the longitudinal flaps of the respective containers and closing off the gap between each adjacent pair of the containers of the train, in which train, in accordance with the present invention, each pivotal connection of the containers includes a spherical joint, the bridging pieces engaging each other by their end faces having conjugating or complementary spherical surfaces having for their geometrical center the center of the adjacent spherical joint.

It is expedient that this spherical joint should be at the bottom side of the container.

The last-described arrangement of the spherical joint has been found to be structurally optimal.

A train of containers for a plant for pneumatic transportation of goods through a tube, constructed in accordance with the present invention, offers fluid-tight sealing of the gaps between the pairs of adjacent containers, which enables to reduce the energy consumption by a train of container being propelled along the tube or pipeline.

Given hereinbelow is a more detailed description of an embodiment of the present invention, with reference being had to the accompanying set of drawings, wherein:

FIG. 1 is a side elevation of a train of containers, embodying the invention;

FIG. 2 is a view in plan of the train of containers shown in FIG. 1;

Figure 4:
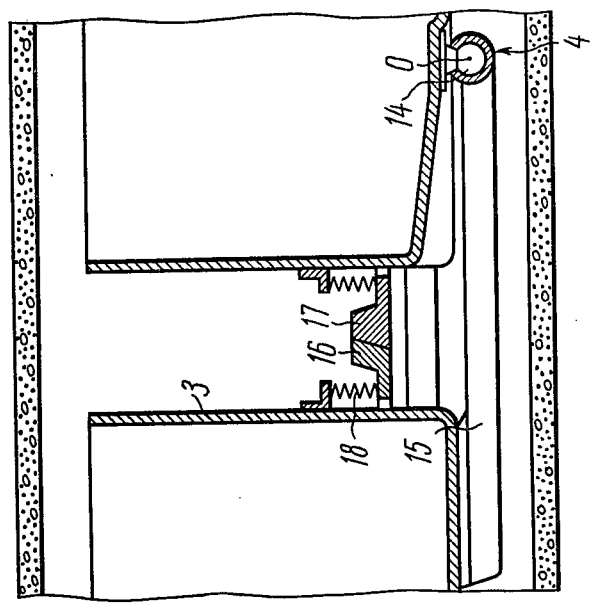
FIG. 4 shows, also on a larger scale, a cross-sectional view taken on line IV—IV of FIG. 2.

In the drawings, a train 1 for a plant for pneumatic transportation of goods along a pipeline or tube 2 contains a plurality of containers 3 interconnected by means of spherical joints 4.

On the end face of the foremost container 3a in the direction of the travel of the train 1, indicated with arrow line A in FIGS. 1 and 2, there is mounted a front flap or seal 5 spanning the lower half of the gap 6 left between the container 3a and the tube 2. The end face of the tailmost container 3b of the train 1 has mounted thereon a tail flap or seal 7 spanning the upper half of the gap 6.

Figure 3:
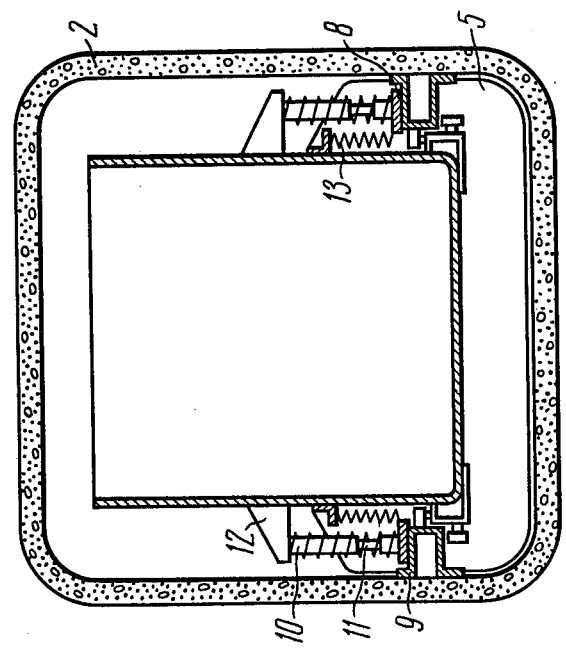
FIG. 3 shows on a larger scale a cross-sectional view taken on line III—III of FIG. 1.

There are mounted on the lateral sides of each container 3, with a certain space or clearance left, longitudinal flaps 8 spanning the gap between the lateral side of the container 3 and the tube 2. The longitudinal flaps 8 bear upon guideways 9 secured to the internal side walls of the tube 2 and acting as supports in a plain-bearing relationship with the longitudinal flaps 8. Each longitudinal flap 8 is resiliently urged against the respective guideway 9 by compression springs 10 (FIG. 3) received about studs 11. Each stud 11 has one end thereof connected to the longitudinal flap 8, while its other end is slidably received in a bracket 12 secured to the respective container 3. To seal the clearance between the side wall of the container and the longitudinal flap 8, there is provided at each side an extensible corrugated partition 13 of which one edge is secured to the longitudinal flap 8, and the other edge is secured to the side wall of the container 3.

Each adjacent pair of the containers 3 is interconnected with a spherical, or ball and socket, joint 4 (FIG. 4) of which one component member, the ball, 14 is secured to the bottom of one container 3 of the pair, while the other component member, the socket, 15, cooperating with the first one, is secured to the bottom of the other container 3 of the pair. This arrangement of the spherical ball and socket joint 4 has been found to be structurally optimal.

To span the gap intermediate each pair of the adjacent containers 3, there are provided bridging pieces 16 (FIGS. 1, 2, 4) and 17 which in the presently described embodiment are made integral with the longitudinal flaps 8 of the respective containers 3 and secured to the opposing end faces of these adjacent containers 3, also with a clearance left between the respective bridging piece and the end face of the container 3. This clearance between the end face of the respective container 3 and the bridging piece 16 or 17 is likewise sealed with a partition 18 made integral with the respective partitions 13 (FIG. 3) and having one edge thereof secured to the bridging piece 16 (or 17, FIG. 4) and the other edge secured to the end face of the respective container 3. The bridging pieces 16 and 17 have their respective end faces engaging each other, the end faces having conjugating or complimentary spherical surfaces having for their geometrical center the centre "O" of the adjacent spherical joint 4.

The disclosed structure of the end faces of the bridging pieces 16 and 17 enables the train 1 of containers 3 master the points of the tube 2 where the latter bends in any direction, and that without affecting the fluid-tight sealing afforded by the bridging pieces of the adjacent containers.

In the presently described embodiment of the present invention the longitudinal flaps are elastically attached to the container. However, this description is by no way intended to limit the scope of the present invention and does not preclude the possibility of using spherical joints for interconnecting adjacent containers and flaps with matching spherical end face surfaces in trains of containers wherein the longitudinal flaps are attached to the respective containers by any other suitable known means.

The train of containers for a plant for pneumatic transportation of goods through a tube operates, as follows.

Prior to the beginning of its motion, the train 1 of the containers 3 is supported by its longitudinal flaps 8 bearing upon the guideways 9.

Then compressed air is supplied into the tube 2, whereby the air fills the space under the train 1. This space under the train 1 is defined by the front flap 5 spanning the lower half of the gap 6 between the container 3a and the tube 2, by the longitudinal flaps 8 spanning the gap between the side walls of the containers 3 and the tube 2 and by the bridging pieces 16 and 17 spanning the gap between the adjacent pairs of the containers 3. Owing to these bridging pieces engaging each other by their end faces having the conjugating complementary spherical surfaces having for their geometrical center the center of the adjacent spherical joint 4, when the train 1 passes through the portions of the path of the tube 2 where the latter bends or curves in various planes, including a vertical plane, e.g. when the train travels from a horizontal portion of the path upon an inclined one, the adjacent bridging pieces displace relative to each other along their conjugating complementary spherical surfaces, which fact minimizes the bleed of compressed air through the gaps between the adjacent containers and, therefore, improves the fluid-tight sealing of the space located above the train 1 from the space located under this train 1.

Owing to the pressure differential or drop from the tail flap 7 to the front one 5, the train 1 starts moving along the tube 2, while the pressure differential at the opposite sides of the longitudinal flaps 8 and of the bridging pieces 16 and 17 creates a lifting force. Thus, the train 1 of the containers 3 is propelled through the tube 2 by hovering in the required direction on an "air cushion".

As the train 1 travels through the tube 2, its longitudinal flaps 8 are urged against the guideways 9 by the effort of the springs 10 received about the studs 11, which minimizes the clearance between the longitudinal flaps 8 and the guides 9 and further saves the energy.

What we claim is:

1. A train of containers for pneumatic transportation of goods through a tube having guideways secured to the internal surface thereof in opposition to one another, throughout the length of the tube, comprising:

a plurality of containers, means for connecting said containers to one another comprising a plurality of ball and socket joints wherein said ball is connected to a container and said socket is connected to an adjacent container wherein said ball and socket are engaged for connecting adjacent containers together, a front flap mounted on the end face of the foremost one of said plurality of containers, in the direction of the travel of said train, said front flap spanning the lower half of a gap defined between said train and said tube; a tail flap mounted on the end face of the tailmost one of said plurality of containers, in the direction of the travel of said train, said tail flap spanning the upper half of the gap defined between the train and said tube; longitudinal flaps mounted on the lateral side of each container of said plurality of containers, said longitudinal flaps acting as the plain bearings of said train of containers in the process of its travel, said longitudinal flaps bearing upon said guideways; bridging piece means mounted on the opposing end faces of adjacent pairs of said plurality of containers for closing off the gaps between said adjacent pairs of said plurality of containers; said bridging piece means comprising engaging means for engaging each other and for engaging said longitudinal flaps of its associated container of said plurality of containers, said engaging means comprising bridge pieces having their end faces forming conjugating spherical surfaces wherein the geometrical center of said spherical surfaces is the center of the adjacent ball and socket engagement.

2. A train of containers, as claimed in claim 1, wherein each said ball and socket joint is arranged at the bottom side of each of said plurality of containers.

* * * * *